United States Patent [19]

Plichta et al.

[11] Patent Number: 5,045,416
[45] Date of Patent: Sep. 3, 1991

[54] HIGH TEMPERATURE MOLTEN SALT THERMAL CELL INCLUDING A TERNARY METAL SULFIDE CATHODE

[75] Inventors: Edward J. Plichta, Howell; Wishvender K. Behl, Ocean Township, Monmouth County, both of N.J.

[73] Assignee: The United States of America as represented by the Secretary of the Army, Washington, D.C.

[21] Appl. No.: 624,940

[22] Filed: Dec. 10, 1990

[51] Int. Cl.$^5$ .................... H01M 4/58; H01M 10/39
[52] U.S. Cl. .................... 429/103; 429/218; 429/223; 429/112

[58] Field of Search ............ 204/67, 70; 429/103, 429/199, 221, 223, 218, 112

[56] References Cited

U.S. PATENT DOCUMENTS 4,143,213  3/1979  Jacobson .................... 429/112
4,447,376  5/1984  Chobanov .................... 264/62

Primary Examiner—Donald R. Valentine
Attorney, Agent, or Firm—Michael Zelenka; Roy E. Gordon

[57] ABSTRACT

A high temperature molten salt thermal cell is provided where the active cathodic materials are ternary metal sulfides as for example, $BaNiS_2$, $BaFeS_2$, and $BaCoS_2$.

2 Claims, 3 Drawing Sheets

HIGH TEMPERATURE MOLTEN SALT THERMAL CELL INCLUDING A TERNARY METAL SULFIDE CATHODE

GOVERNMENT INTEREST

The invention described herein may be manufactured, used, and licensed by or for the Government for governmental purposes without the payment to us of any royalty thereon.

FIELD OF INVENTION

This invention relates in general to a high temperature molten salt thermal cell and in particular to such a cell where the active cathodic material is a ternary metal sulfide as for example $BaNiS_2$, $BaFeS_2$, and $BaCoS_2$ and substituted compounds having the compositions $XYS_2$ where X can be Be, Mg, Ca, Sr, Ba, or Ra, and Y can be Fe, Co, or Ni.

BACKGROUND OF THE INVENTION

High temperature molten salt thermal cells are required for applications in fuses, projectile rockets, bombs, missiles, decoys, jammers and torpedoes. Thermal batteries are reserve-type primary batteries that can be activated by heating with a pyrotechnic heat source such as zirconium and barium chromate powders or mixture of iron powder and potassium perchlorate. Amongst the many molten salt battery systems that have been studied over the past many years, the lithium alloy/metal sulfide cell has shown considerable promise for these applications. Heretofore, these cells have used a lithium alloy (Li-Al) as the anode, an electrolyte of lithium halide-alkali halide mixture (LiCl-KCl eutectic) and a cathode having as the cathode active material a binary metal sulfide of the general formula YS or $YS_2$ where Y=Fe, Co, or Ni.

Though the binary metal sulfides have been useful as the cathode active materials, it would be desirable to provide cathode active materials with higher thermal stability at higher temperatures, and also provide cathode active materials with higher specific energy densities and higher specific power densities.

SUMMARY OF THE INVENTION

The object of this invention is to provide a high temperature molten salt thermal cell where the active cathode material is thermally stable a high temperatures and also provide high specific energy densities and specific power densities.

It has now been found that the aforementioned object can be attained by providing a molten salt electrochemical thermal cell where the active cathodic materials are ternary metal sulfides as for example $BaNiS_2$, $BaFeS_2$, and $BaCoS_2$ and substituted compounds having the compositions $XYS_2$ where X can be Be, Mg, Ca, Sr, Ba, or Ra and Y can be Fe, Co, or Ni. Use of these materials as the cathode active materials in the electrochemical cell containing a Li-Al alloy anode, LiCl-KCl eutectic electrolyte, lyte, MgO separator, and $BaNiS_2$ cathode have been demonstrated to deliver specific energy densities of 244 and 109 KJ/Kg (based on total weight of cell stack) at discharge rates of 0.1 and 1.0 A/cm$^2$, respectively at 400° C. The average discharge voltage for the 0.1 and 1.0 A/cm rates at 400° C. are 1.43 and 1.21 volts, respectively and correspond to power densities of 0.64 KW/Kg at 0.1 A/cm$^2$ and 5.4 KW/Kg at 1.0 A/cm$^2$.

DESCRIPTION OF THE DRAWING AND THE PREFERRED EMBODIMENT

Figure 1:
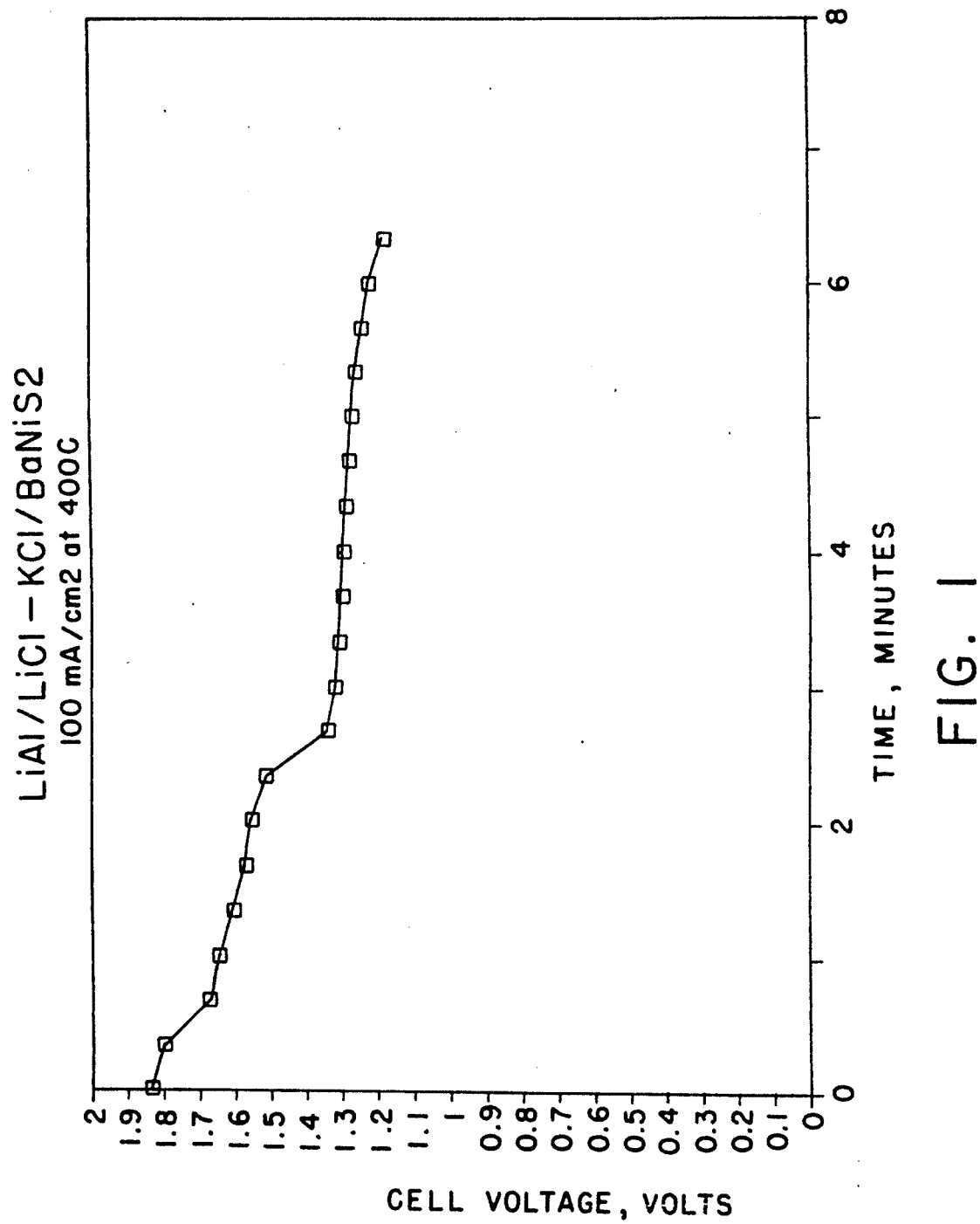
FIGS. 1 and 2 show discharge curves for the molten salt electrochemical thermal cell Li/LiCl-KCl/BaNiS$_2$ at 400° C.
Figure 2:
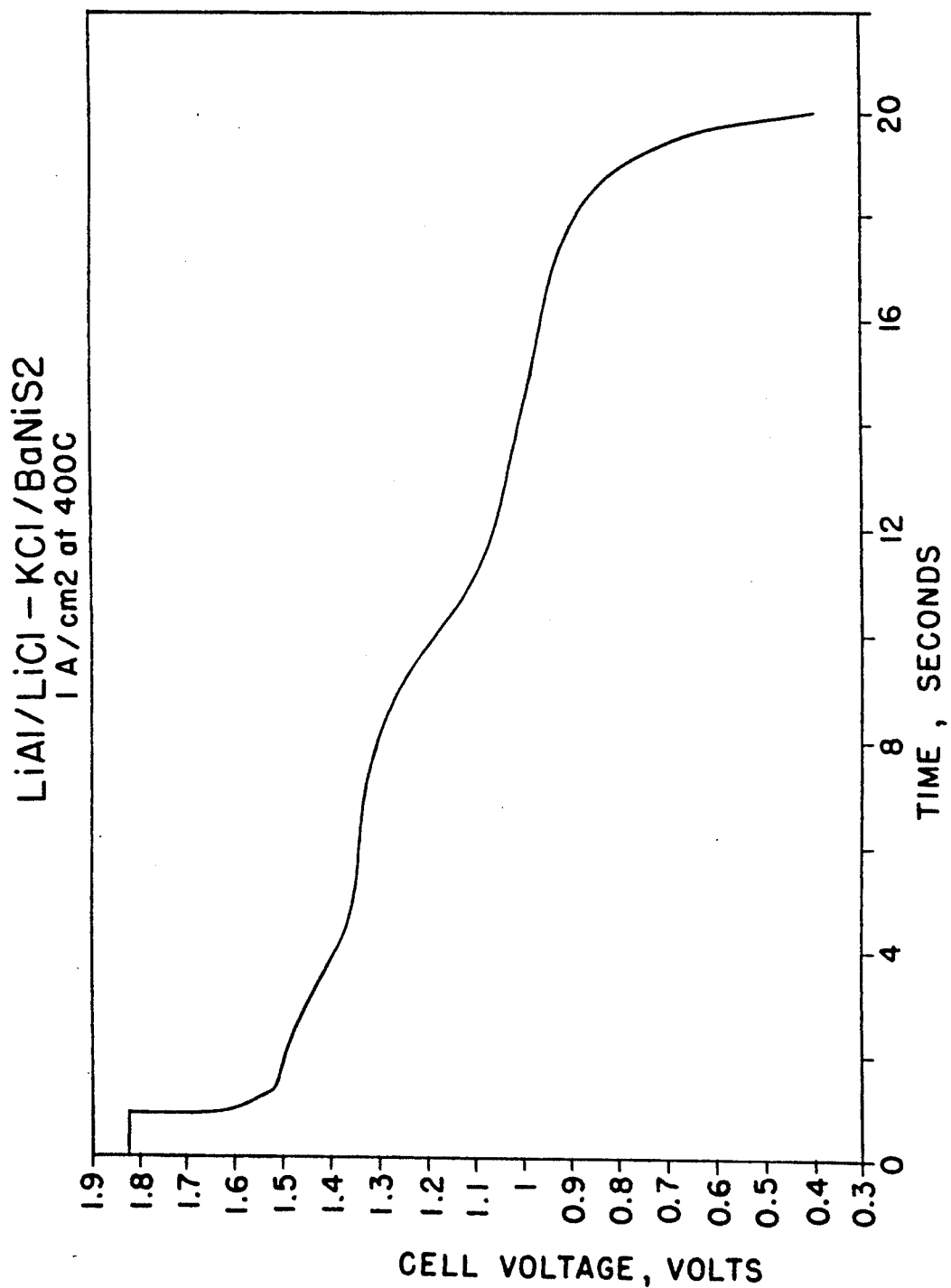

FIGS. 1 and 2 show discharge curves for the molten salt electrochemical thermal cell LiAl/LiCl-KCl/BaNiS at 400° C.

The electrochemical thermal cell described herein uses a lithium-aluminum (48 atomic percent Li) alloy as the anode, a eutectic mixture of lithium chloride (59 mole percent) and potassium chloride (41 mole percent) with a melting point of 352° C. the electrolyte, and barium nickel sulfide (BaNiS$_2$) as the cathode active material. The electrochemical cell includes a three pellet stack of anode, separator, and cathode. The cathode pellet includes 0.12 gram (85 weight percent BaNiS and 15 weight percent (LiCl-KCl) pressed to 1500 pounds pressure in a ½ inch die. A separator pellet is then pressed onto the cathode pellet by pressing 0.05 gram (50 weight percent MgO and 50 weight percent (LiCl-KCl) in the ½ inch diameter die to 1500 pounds pressure. On the side of the separator opposing the cathode pellet an anode including 0.14 gram (65 weight percent LiAl) and 35 weight percent LiCl-KCl) is pressed in the ½ inch diameter die to a pressure of 4,000 pounds. The pressed cell stack is placed into a ½ inch diameter ⅜ inch high boron nitride bushing to guard against edge shorting. The pellet stack is held in compression through the use of a spring loaded assembly affixed with a mdybdenum metal disk at the anode side and a graphite disk at the cathode side to act as current collectors. The spring loaded cell assembly is placed into a pyrex vessel that enables the cell to be operated over a (an hydrous) flowing argon atmosphere. Feed through connections through the top of the pyrex vessel provide electrical connection to the positive and negative terminals of the cell.

Figure 3:
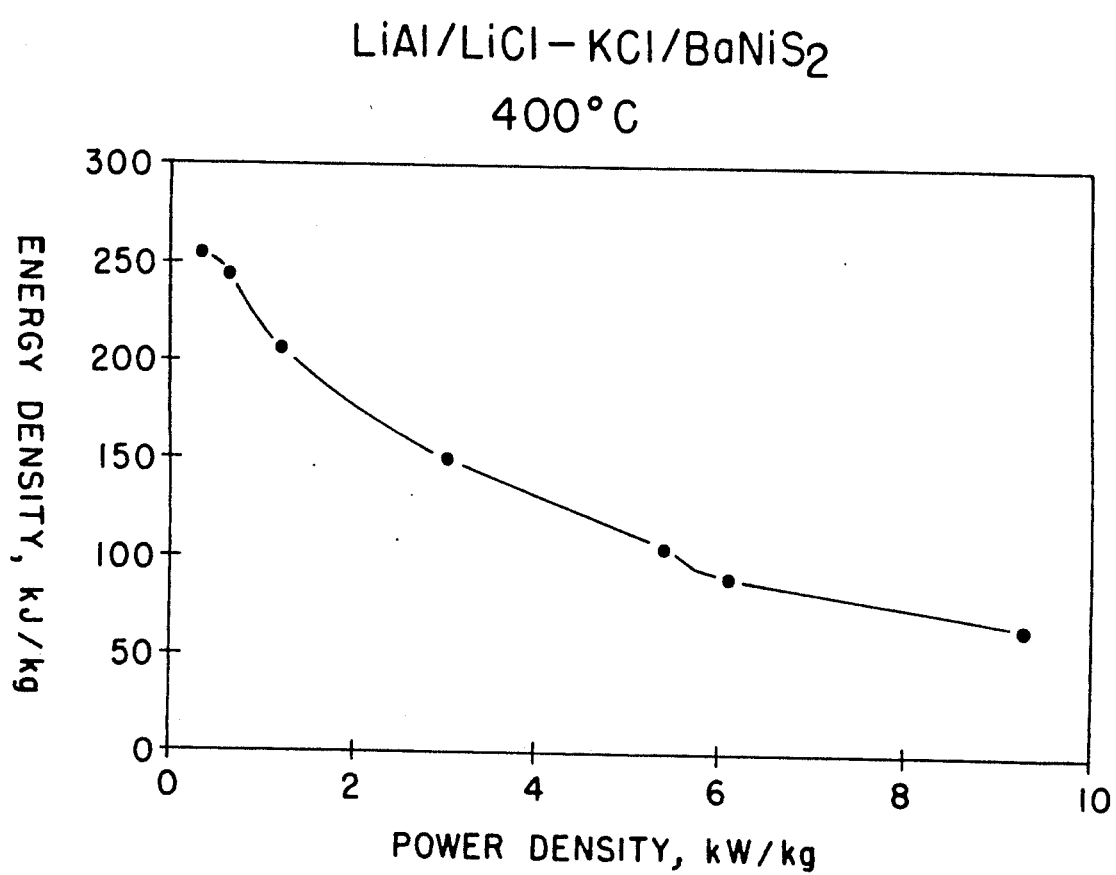
FIG. 3 demonstrates the energy density (KJ/Kg) as a function of power density (KW/Kg) based on the total cell stack weight for the LiAl/LiCl-KCl/BaNiS$_2$ cell at 400° C.

Referring to FIG. 1, based on the following electrochemical cell reaction:

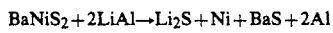

$$BaNiS_2 + 2LiAl \rightarrow Li_2S + Ni + BaS + 2Al$$

the observed cathode utilization at a discharge rate of 100mA/cm$^2$ is found to be 64 percent (1.28 F/mole) at an average cell potential of 1.43V. This corresponds to an energy density based solely on BaNiS$_2$ of 677 KJ/Kg. Referring to FIG. 2, the observed cathode utilization at a discharge rate of 1.0 A/cm$^2$ is found to be 33 percent (0.66 F/mole) at an average cell potential of 1.21V. This corresponds to an energy density based solely on BaNiS$_2$ of 295 KJ/Kg. FIG. 3 demonstrates the energy density (KJ/Kg)$^2$ as a function of power density (KW/Kg) based on the total cell stack weight for the LiAl/LiCl-KCl/BaNiS$_2$ cell at 400° C. In addition, the ternary metal sulfides are found to possess excellent thermal stability to temperatures above 800° C. Thermal weight loss measurements performed using a Perkin-Elmer model TCS-2 thermogravimetric analyzer under an argon atmosphere show that $BaNiS_2$ is thermally stable to nearly 850° C.

As the anode of the high temperature molten salt electrochemical cell, one might use Li, LiAl, Na, K, Ca, Mg or any alkali metal or group IIA element, or alloy or composite mixture. Electrolyte content from 0 to 20 weight percent may be used in the anode.

The separator material of the high temperature molten thermal salt cell may be MgO, $Y_2O_3$ or $ZrO_2$, including other such electrically insulative materials, or beta alumina, or other such ionically conductive separator materials. The separation between the anode and cathode may be provided by a 50 to 65 weight percent molten salt electrolyte including any alkali or alkaline earth chloride, fluoride, bromide, iodide or mixture thereof with 50 to 35 weight percent of a separator materials as aforementioned.

We wish it to be understood that we do not desire to be limited to the exact details of construction shown and described for obvious modifications will occur to a person skilled in the art.

What is claimed is:

1. A high temperature molten salt electrochemical cell including a lithium-aluminum alloy as the anode, a eutectic mixture of lithium chloride and potassium chloride with a melting point of 352° C. as the electrolyte, and barium nickel sulfide ($BaNiS_2$) as the cathode active material.

2. A high temperature molten salt electrochemical cell including a three pellet stack of anode, separator, and cathode, the cathode pellet including 0.12 gram (85 weight percent $BaNiS_2$ and 15 weight percent LiCl-KCl) pressed to 1500 pounds pressure in a ½ inch diameter die, a separator pellet pressed onto the cathode pellet by pressing 0.05 gram (50 weight percent MgO and 50 weight percent LiCl-KCl) in the ½ inch diameter die to 1500 pounds pressure, and an anode on the side of the separator opposing the cathode pellet, the anode comprising 0.14 gram (65 weight percent LiAl and 35 weight percent LiCl-KCl) pressed in the ½ inch diameter die to a pressure of 4000 pounds.

* * * * *